(12) United States Patent
Blaski et al.

(10) Patent No.: US 9,897,125 B2
(45) Date of Patent: Feb. 20, 2018

(54) FASTENER WITH RETAINING PORTION

(71) Applicant: GM Global Technology Operations LLC, Detroit, MI (US)

(72) Inventors: Bradley J. Blaski, Sterling Heights, MI (US); Richard C. Janis, Grosse Pointe Woods, MI (US); Pei-chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 15/158,839

(22) Filed: May 19, 2016

(65) Prior Publication Data
US 2017/0335876 A1 Nov. 23, 2017

(51) Int. Cl.
*F16B 19/08* (2006.01)
*F16B 5/04* (2006.01)

(52) U.S. Cl.
CPC .............. *F16B 19/086* (2013.01); *F16B 5/04* (2013.01); *F16B 19/08* (2013.01)

(58) Field of Classification Search
CPC .. F16B 5/04; F16B 19/04; F16B 19/08; F16B 19/086; F16B 19/10; F16B 19/1027; F16B 19/1054; F16B 2019/1018
USPC ........................ 411/500, 501, 507; 511/501
See application file for complete search history.

(56) References Cited

U.S. PATENT DOCUMENTS

| | | | | |
|---|---|---|---|---|
| 384,318 A * | 6/1888 | Kirks | ...................... | F16B 19/06 411/501 |
| 2,562,336 A * | 7/1951 | Selden | ...................... | F16B 5/04 29/445 |
| 3,107,408 A * | 10/1963 | Huelster | ............ | A44B 17/0029 24/621 |
| 4,177,545 A * | 12/1979 | Lambertz | ................. | B21J 15/02 29/11 |
| 4,854,438 A * | 8/1989 | Weissenberger | .......... | F16B 5/04 192/107 M |
| 5,359,765 A * | 11/1994 | Auriol | ..................... | F16B 19/08 29/512 |
| 7,731,467 B2 * | 6/2010 | Babej | ...................... | F16B 19/08 411/183 |
| 8,250,728 B2 * | 8/2012 | Stevenson | .............. | B21J 15/025 29/525.14 |
| 8,764,363 B2 * | 7/2014 | Yang | ........................ | F16B 19/08 411/339 |
| 9,555,466 B2 * | 1/2017 | Ueda | ..................... | F16B 19/086 |
| 2008/0149256 A1 * | 6/2008 | Wang | ..................... | B21J 15/025 156/92 |
| 2010/0119330 A1 * | 5/2010 | Auriol | .................... | B21J 15/046 411/501 |
| 2013/0055549 A1 * | 3/2013 | Auriol | ..................... | B21J 15/02 29/525.07 |
| 2013/0336745 A1 * | 12/2013 | Trinick | ................. | F16B 19/086 411/501 |
| 2014/0186133 A1 * | 7/2014 | Dehlke | ............... | F16B 19/1054 411/43 |
| 2014/0242373 A1 * | 8/2014 | Campbell | ......... | B29C 66/81431 428/304.4 |

* cited by examiner

*Primary Examiner* — Roberta S Delisle

(57) ABSTRACT

A fastener is provided. The fastener includes a fastening portion configured to fasten a body; and a retaining portion configured to retain a portion of the body after the fastening portion is fastened to the body. The fastener apparatus may be used to attach composite body materials to a vehicle.

10 Claims, 5 Drawing Sheets

FASTENER WITH RETAINING PORTION

Apparatuses and systems consistent with exemplary embodiments relate to fasteners. More particularly, apparatuses consistent with exemplary embodiments relate to fasteners such as rivets configured to attach two bodies together.

SUMMARY

One or more exemplary embodiments provide a fastener configured to attach or hold two bodies together. More particularly, one or more exemplary embodiments provide a fastener with a retainer portion configured to retain a portion of a body or bodies to which the fastener is attached.

According to an aspect of an exemplary embodiment, a fastener apparatus for a vehicle is provided. The fastener apparatus for a vehicle includes a head portion; a fastening portion connected to the head portion, the fastening portion configured to fasten a body of the vehicle; and a retaining portion configured to retain a portion of the body of the vehicle after the fastening portion is fastened to the body of the vehicle.

According to an aspect of another exemplary embodiment, a fastener apparatus is provided. The fastener apparatus includes: a head portion; a fastening portion connected to the head portion, the fastening portion configured to fasten a body; and a retaining portion configured to retain a portion of the body after the fastening portion is fastened to the body.

The fastener apparatus may also include a rivet comprising the head portion, the fastening portion and the retaining portion.

The fastening portion may include a cylindrical body.

The retaining portion may be an interior part of the cylindrical body.

The interior part of the cylindrical body may be partially hollow from a first end of the cylindrical body to a point that distal from a second end of the cylindrical body.

The interior part of the cylindrical body may include at least one from among serrations, teeth, notches, and jagged edges.

The interior part of the cylindrical body may be hollow from a first end of the cylindrical body a second end of the cylindrical body.

The interior part of the head portion may include a hollow center portion.

The body may include a polymeric composite material.

The interior part of the cylindrical body may include a first hollow interior portion and a second hollow interior portion. The first hollow interior portion may have a first diameter larger than a second diameter of the second hollow interior portion.

The retained portion of the body may include at least one from among a slug, a non-integral portion of the body, and a portion that is disconnected from the body.

According to an aspect of another exemplary embodiment, a fastener apparatus is provided. The fastener apparatus includes: a fastening portion configured to fasten a body; and a retaining portion configured to retain a portion of the body after the fastening portion is fastened to the body.

The fastener apparatus may also include a rivet comprising the head portion, the fastening portion and the retaining portion.

The fastening portion may include a cylindrical body.

The retaining portion may be an interior part of the cylindrical body.

The interior part of the cylindrical body may be partially hollow from a first end of the cylindrical body to a point that distal from a second end of the cylindrical body.

The interior part of the cylindrical body may include at least one from among serrations, teeth, notches, and jagged edges.

The interior part of the cylindrical body may be hollow from a first end of the cylindrical body a second end of the cylindrical body.

The body may include a polymeric composite material.

The interior part of the cylindrical body may include a first hollow interior portion and a second hollow interior portion. The first hollow interior portion may have a first diameter larger than a second diameter of the second hollow interior portion.

The retained portion of the body may include at least one from among a slug, a non-integral portion of the body, and a portion that is disconnected from the body.

Other objects, advantages and novel features of the exemplary embodiments will become more apparent from the following detailed description of exemplary embodiments and the accompanying drawings.

DETAILED DESCRIPTION

Figure 1:
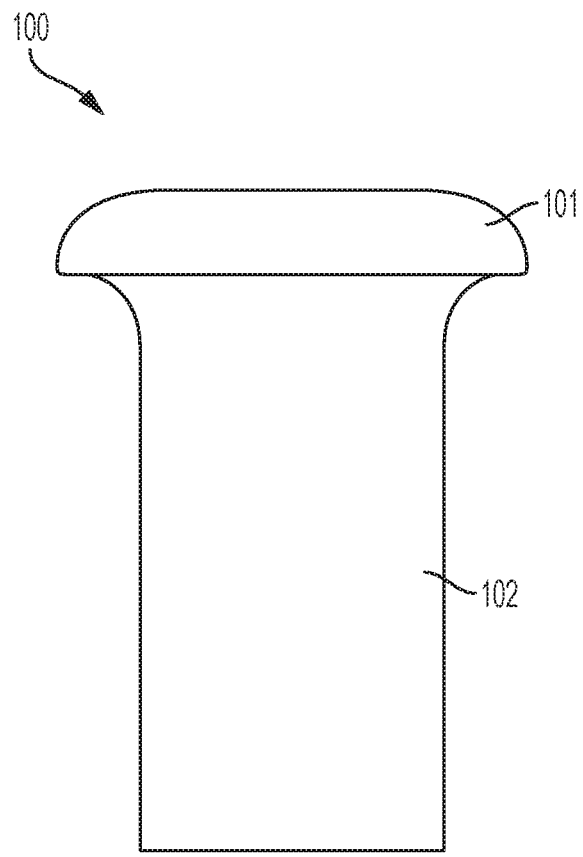
FIG. 1 shows a perspective view of a fastener according to an exemplary embodiment.

Fasteners such as rivets are used to attach, bind or tie together separated bodies. One application of a fastener is to tie together parts of a body of a vehicle. As new materials are being used to construct lighter and more fuel efficient vehicles, there is a need for new types of fasteners to attach or hold together vehicle components made of newer materials such as polymeric composites.

A fastener with a retaining portion will now be described in detail with reference to FIGS. 1-4B of the accompanying drawings in which like reference numerals refer to like elements throughout. The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element unless it is stated that a first element is "directly" connected to, formed on, or disposed on the second element.

FIG. 1 shows a view of a fastener 100 according to an exemplary embodiment. Referring to FIG. 1, a fastener 100 includes a head portion 101 and a fastening portion 102. One or more of the head portion 101 and the fastening portion 102 may have hollow centers that make up a retaining portion. The head portion 101 may comprise a flat disc, a cylindrical disk, a spherical shape, or semi-spherical shape. The fastening portion 102 may comprise a shaft, a cylinder, a partially hollow cylinder, a hollow cylinder, etc. The cylinder may be circular, rectangular, squared, elliptical, etc., in shape. The interior part of the fastening portion, which may be partially or completely hollow, may make up the retaining portion. The interior part of the cylindrical body may be partially hollow from a first end of the cylindrical body to a point that distal from a second end of the cylindrical body. Here the first end of the cylindrical body is the piercing end that is configured to pierce a body.

The head portion 101, the fastening portion 102, and the retaining portion may integrally form the fastener 100. In one example, the fastener 100 may be a rivet or other type of fastener. The fastener 100 may be formed by a machining process performed on a compound or material such as a metal. Alternatively, the fastener 100 may be formed by injecting a liquid or a gel compound into a mold and allowing the compound to solidify. However, the fastener 100 is not limited to above discussed processes and may be created using other processes.

Figure 2:
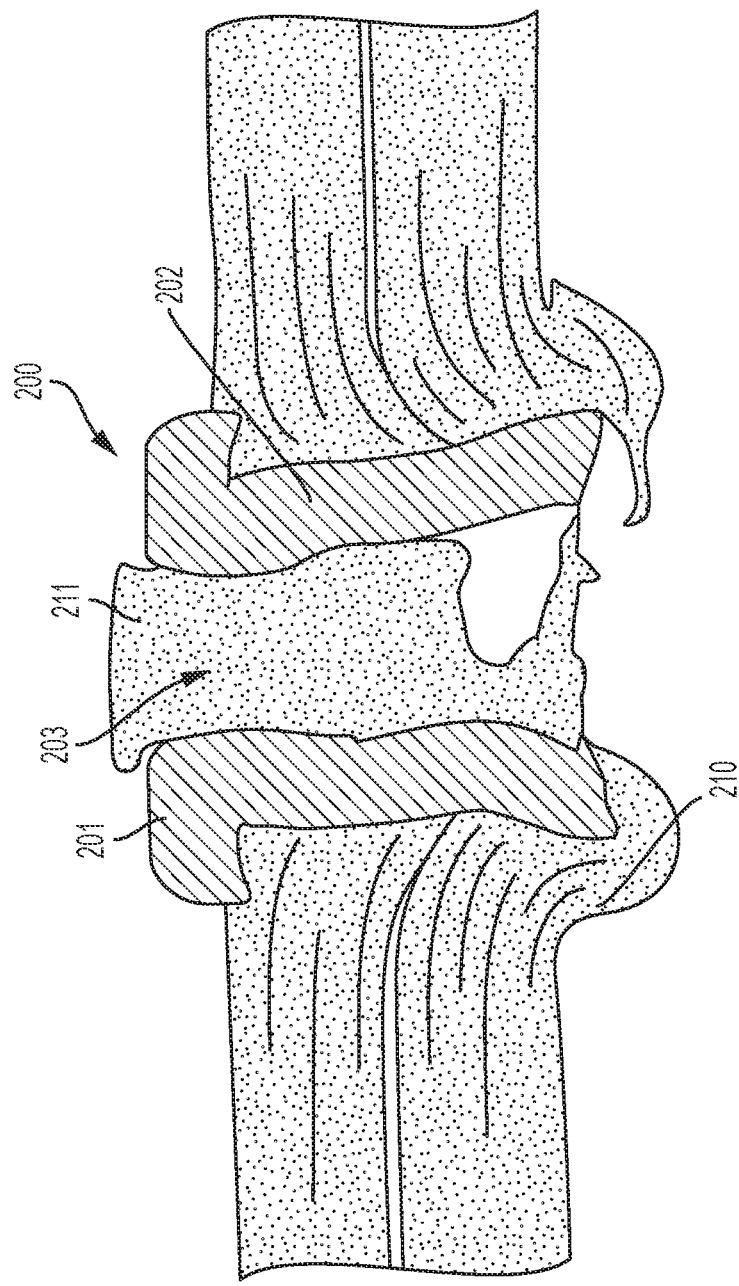
FIG. 2 shows a cross-sectional view of a fastener piercing a composite body according to an aspect of an exemplary embodiment.

FIG. 2 shows a perspective view of a fastener 200 piercing a composite body 210 according to an aspect of an exemplary embodiment. Referring to FIG. 2, a fastener 200 includes a head portion 201 and a fastening portion 202. As shown in FIG. 2, the head portion 201 and the fastening portion 202 have an interior part that is hollow. The hollow interior part makes up the retaining portion 203. The retaining portion 203 retains a slug 211, which is a portion of the body 210 that has partially or fully broken away from the body 210 after the body 210 is pierced by the fastener 200. The slug 211 may be a non-integral portion of the body 210. The body may comprise a polymeric composite material.

Figure 3:
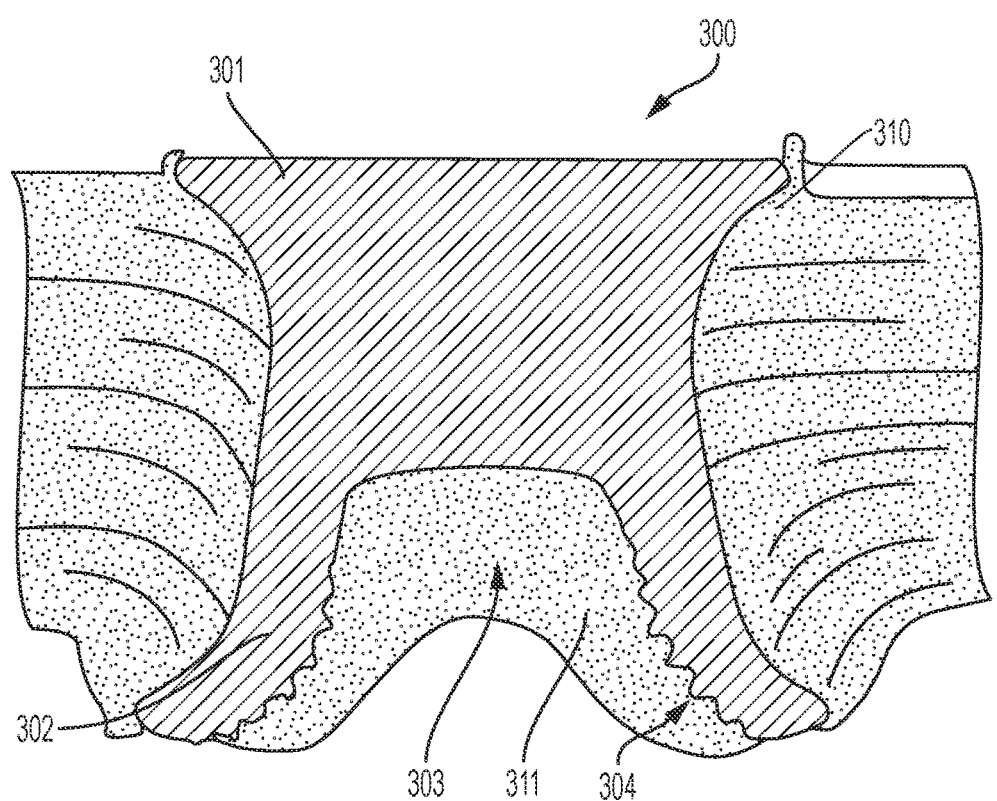
FIG. 3 shows a cross-sectional view of a fastener piercing a composite body according to an aspect of another exemplary embodiment.

FIG. 3 shows a perspective view of a fastener 300 piercing a composite body 310 according to an aspect of another exemplary embodiment. Referring to FIG. 3, a fastener 300 includes a head portion 301 and a fastening portion 302. As shown in FIG. 2, the fastening portion 302 may be a cylindrical body that has an interior part that is partially hollow from one end to a point that distal from a second end of the cylindrical body. The hollow interior part makes up the retaining portion 303. The retaining portion 303 may include serrations 304 (e.g., teeth, notches, threads or jagged edges). The serrations may be formed by tapping threads into the retaining portion 303. The retaining portion 303 retains a slug 311, which is a portion of the body 310 that has partially or fully broken away from the body 310 after the body 310 is pierced by the fastener 300. The slug 311 may be a non-integral portion of the body 310. The body may comprise a polymeric composite material (e.g., a thermoplastic composite material, a carbon fiber material, a fiberglass material, etc.).

Figure 4A:
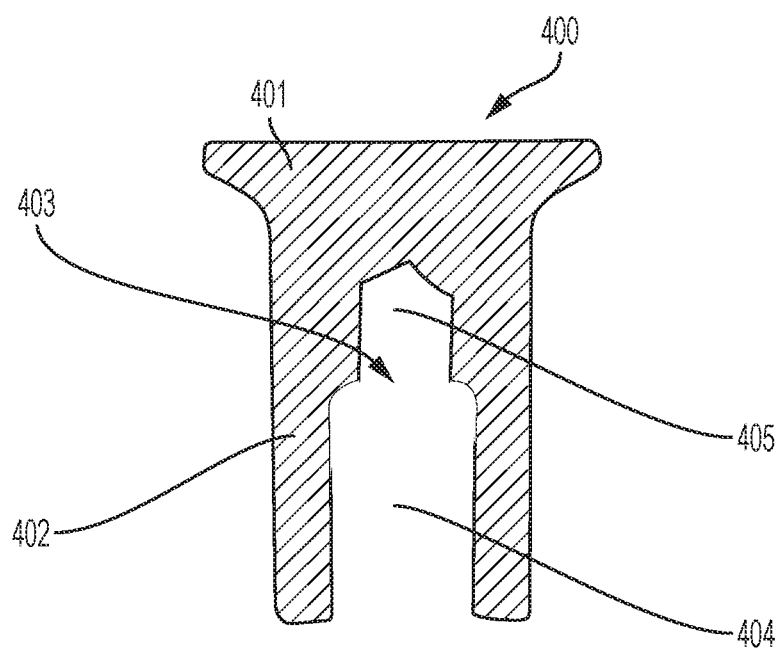
FIGS. 4A and 4B show cross-sectional views of a fastener and a fastener piercing a composite body according to an aspect of another exemplary embodiment.
Figure 4B:
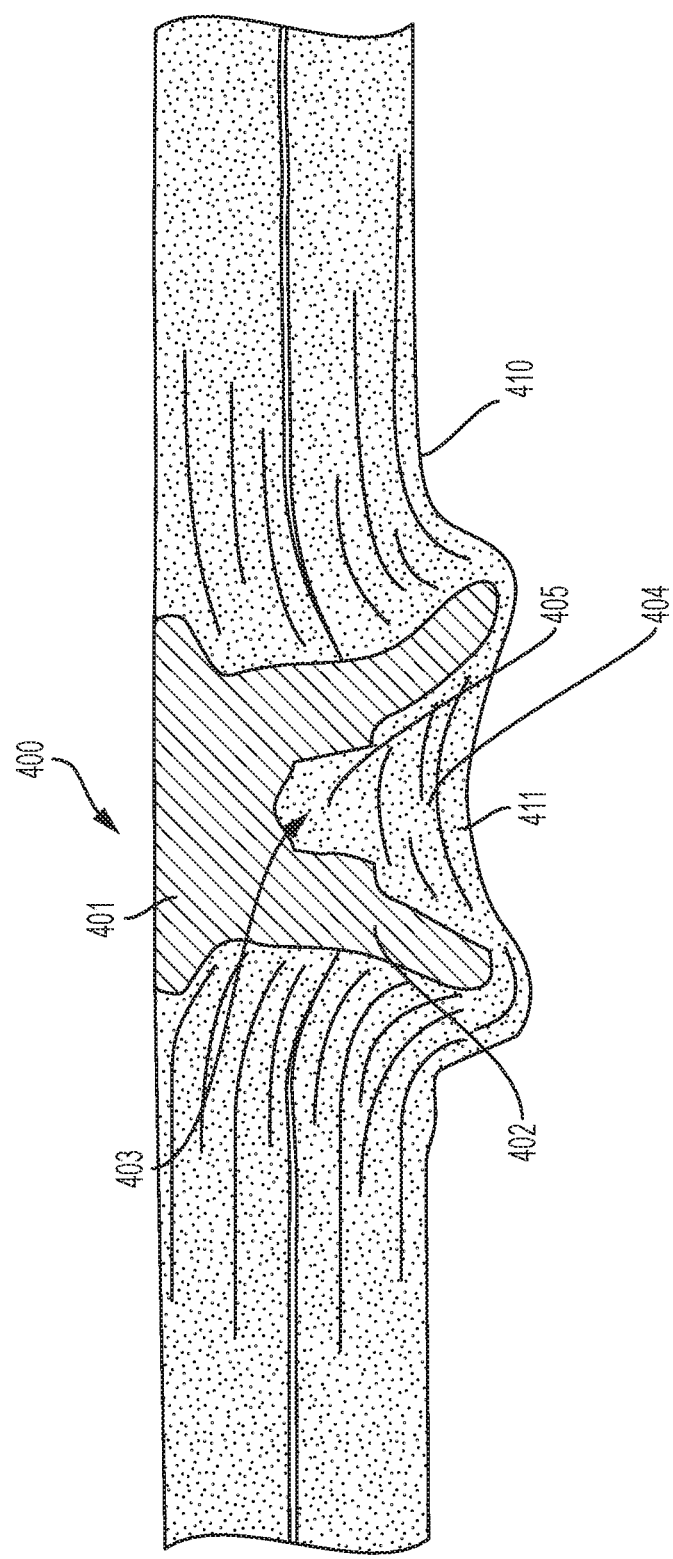

FIGS. 4A and 4B show perspective views of a fastener 400 and a fastener 400 piercing a composite body 410 according to an aspect of another exemplary embodiment. Referring to FIG. 4A, a fastener 400 includes a head portion 401 and a fastening portion 402. The hollow interior part makes up the retaining portion 403. The retaining portion 403 may include a two-step hollow portion. The first hollow interior portion 404 may have a larger diameter than a second hollow interior portion 405. The retaining portion 403 with the first hollow interior portion 404 and the second hollow interior portion 405 may be designed so that the fastener can withstand an impact force necessary to pierce one or more bodies while still holding the bodies together. Referring to FIG. 4B, the fastener 400 may pierce a composite body 410 and a slug 411 may be retained in the first hollow interior portion 404 and the second hollow interior portion 405.

The fasteners describe above may be used to hold together polymeric composite to polymeric composite materials, metal to polymeric composite materials, etc. In particular, the fasteners described above may hold together a stack of sheets of material, where a composite sheet is at the bottom of the stack of sheets of materials being held together. The other materials in the stack may be different types of materials. The fastener, according to an exemplary embodiment, may be used to pierce through a composite sheet and form a hook to bind or hold the composite sheet to a body or set of sheets. The sheets may include one or more from among a metallic material, a polymeric composite material (e.g., a thermoplastic composite material, a carbon fiber material, a fiberglass material, etc).

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A fastener apparatus for a vehicle, the fastening apparatus comprising:
    a head portion;
    a fastening portion comprising a cylindrical body connected to the head portion, the fastening portion configured to fasten a body of the vehicle; and
    a retaining portion comprising an interior part of the cylindrical body configured to retain a portion of the body of the vehicle after the fastening portion is fastened to the body of the vehicle,
    wherein the interior part of the cylindrical body includes a partially hollow portion from that extends from a first end of the cylindrical body to a point that distal from the head portion, and
    wherein the hollow portion of the cylindrical body comprises at least one from among serrations, teeth, notches, and jagged edges.

2. A fastener apparatus comprising:
    a head portion comprising a solid center;
    a fastening portion comprising a cylindrical body connected to the head portion, the fastening portion configured to fasten a body; and
    a retaining portion comprising an interior part of the cylindrical body configured to retain a portion of the body after the fastening portion is fastened to the,
    wherein the interior part of the cylindrical body is hollow from a first end of the cylindrical body to a second end of the cylindrical body,
    wherein the interior part of the cylindrical body comprises a notch, a first hollow interior portion and a second hollow interior portion,
    wherein the first hollow interior portion has a first diameter larger than a second diameter of the second hollow interior portion, and
    wherein the notch is disposed above the second hollow interior portion.

3. The apparatus of claim 2, further comprising a rivet comprising the head portion, the fastening portion and the retaining portion.

4. The apparatus of claim 3, wherein the interior part of the cylindrical body is partially hollow from a first end of the cylindrical body to a point that distal from a second end of the cylindrical body, the second end being an end nearest to the head.

5. The apparatus of claim 3, wherein the retained portion of the body comprises at least one from among a slug, a non-integral portion of the body, and a portion that is disconnected from the body.

6. A fastener apparatus comprising:
   a fastening portion comprising a cylindrical body configured to fasten a body; and
   a retaining portion comprising an interior part of the cylindrical body configured to retain a portion of the body after the fastening portion is fastened to the body
   wherein the interior part of the cylindrical body is hollow from a first end of the cylindrical body to a second end of the cylindrical body,
   wherein the interior part of the cylindrical body comprises a first hollow interior portion and a second hollow interior portion,
   wherein the first hollow interior portion has a first diameter larger than a second diameter of the second hollow interior portion, and
   wherein the first diameter is substantially uniform length.

7. The apparatus of claim 6, further comprising a rivet comprising the fastening portion and the retaining portion.

8. The apparatus of claim 7, wherein the interior part of the cylindrical body is partially hollow from a first end of the cylindrical body to a point that distal from a second end of the cylindrical body.

9. The apparatus of claim 8, wherein the interior part of the cylindrical body comprises at least one from among serrations, teeth, notches, and jagged edges.

10. The apparatus of claim 9, wherein the retained portion of the body comprises at least one from among a slug, a non-integral portion of the body, and a portion that is disconnected from the body.

* * * * *